United States Patent
Ham et al.

(10) Patent No.: US 10,483,564 B2
(45) Date of Patent: Nov. 19, 2019

(54) FLOW FRAME FOR REDOX FLOW BATTERY

(71) Applicant: OCI COMPANY LTD., Seoul (KR)

(72) Inventors: Sung Seek Ham, Seongnam-si (KR); Myung Sup Um, Seongnam-si (KR); Byung Chul Kim, Seongnam-si (KR); Sang Eun Park, Seongnam-si (KR); Nam Jin Lee, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 190 days.

(21) Appl. No.: 15/641,870

(22) Filed: Jul. 5, 2017

(65) Prior Publication Data

US 2018/0062188 A1    Mar. 1, 2018

(30) Foreign Application Priority Data

Aug. 26, 2016    (KR) .................. 10-2016-0109574

(51) Int. Cl.
| | |
|---|---|
| *H01M 8/04082* | (2016.01) |
| *H01M 8/18* | (2006.01) |
| *H01M 8/04* | (2016.01) |
| *H01M 8/02* | (2016.01) |
| *H01M 8/10* | (2016.01) |

(52) U.S. Cl.
CPC ....... *H01M 8/04201* (2013.01); *H01M 8/188* (2013.01); *Y02E 60/528* (2013.01)

(58) Field of Classification Search
CPC .............. H01M 8/04; H01M 8/04201; H01M 8/04082; H01M 8/18; H01M 8/188; H01M 8/02; H01M 8/10
See application file for complete search history.

(56) References Cited

U.S. PATENT DOCUMENTS

2016/0329592 A1* 11/2016 Kim ................ H01M 8/188
2017/0229715 A1*  8/2017 Chou .............. H01M 8/0258

\* cited by examiner

*Primary Examiner* — Karie O'Neill Apicella
(74) *Attorney, Agent, or Firm* — Hauptman Ham, LLP

(57) ABSTRACT

A flow frame for a redox flow battery includes: a frame body having a plate-like shape and an electrode hole in its center where an electrode is to be disposed; four through holes disposed at corners of the frame body, respectively; a flow channel disposed at a front of the frame body above and below the electrode hole so that two of the through channels diagonal to each other as a pair are connected to each other via the electrode hole; through channels disposed at distal ends of the flow channel to cause electrolyte flows toward a rear of the frame body; and a distribution channel connecting the through channels with the electrode hole at the rear of the frame body. The flow channel has at least one branch point, and a change in cross sectional area of the flow channel before and after the branch point is 10% or less.

5 Claims, 5 Drawing Sheets

FLOW FRAME FOR REDOX FLOW BATTERY

CROSS-REFERENCE TO RELATED APPLICATIONS

This application claims the priority of Korean Patent Application No. 10-2016-0109574 filed on Aug. 26, 2016, in the Korean Intellectual Property Office, the disclosure of which is hereby incorporated by reference in its entirety.

BACKGROUND

1. Technical Field

The present disclosure relates to a flow frame for a redox flow battery, and more particularly, to a flow frame for a redox flow battery that increases the efficiency of distribution of electrolytes and reduces shunt current by way of disposing channels efficiently.

2. Description of the Related Art

A redox flow battery is a device that converts the chemical energy of electrolyte into electric energy through a battery cell.

FIG. 1 is a schematic view showing a configuration of a redox flow battery.

As shown in FIG. 1, the redox flow battery stores catholyte in a catholyte tank 110, and anolyte in an anolyte tank 112.

The electrolytes stored in the catholyte tank 110 and the anolyte tank 112 are introduced into a cathode cell 102A and an anode cell 102B of a cell 102 through a catholyte pump 114 and an anolyte pump 116, respectively.

In the cathode cell 102A, electrons move through an electrode 106 in accordance with the operation of a power source/load 118, such that an oxidation/reduction reaction occurs. Likewise, in the anode cell 102B, electrons move through an electrode 108 in accordance with the operation of the power source/load 118, such that an oxidation/reduction reaction occurs. After the oxidation/reduction reaction, the catholyte and the anolyte are circulated to the catholyte tank 110 and the anolyte tank 112, respectively.

The cathode cell 102A and the anode cell 102B are separated by an ion exchange membrane 104 through which ions can pass. Accordingly, movement of ions, that is, crossover, may occur between the cathode cell 102A and the anode cell 102B. That is, during the charging/discharging processes of the redox flow battery, the ions in the catholyte in the cathode cell 102A can move to the anode cell 102B, while the ions in the anolyte in the anode cell 102B can move to the cathode cell 102A.

The operating voltage of the battery cells is about 1.0 to 1.7 V, which is a relatively low voltage. Accordingly, in order to increase the operating voltage, cells are stacked in series to form a stack module (cell stack). The cell stack has a structure in which a number of battery cells are electrically connected in series and the electrolytes are shared in parallel.

The current flowing between the battery cells through a path where electrolytes are shared is referred to as a shunt current. The shunt current occurs inside or between stacks and cause self-discharge of the stacks. The self-discharge reduces the energy stored in the stacks even in a standby state when the redox flow battery is not operating.

Exemplary embodiments of the present disclosure are directed to reducing shunt current loss occurring between unit stacks of a redox flow battery, thereby reducing the self-discharge of the redox flow battery and improving the overall energy efficiency.

SUMMARY

The present disclosure provides a flow frame capable of reducing shunt current loss occurring between unit stacks of a redox flow battery.

Exemplary embodiment of the present disclosure provides a flow frame for a redox flow battery. The redox flow battery includes: a frame body having a plate-like shape and an electrode hole in its center where an electrode is to be disposed; four through holes disposed at corners of the frame body, respectively; a flow channel disposed at a front of the frame body above and below the electrode hole so that two of the through channels diagonal to each other as a pair are connected to each other via the electrode hole; through channels disposed at distal ends of the flow channel to cause electrolyte flows toward a rear of the frame body; and a distribution channel connecting the through channels with the electrode hole at the rear of the frame body, wherein the flow channel has at least one branch point, and a change in cross sectional area of the flow channel before and after the branch point is 10% or less.

The flow channel may include a first flow channel connected to the through hole and second flow channels branching off from the first flow channel, and a length of the first flow channel may occupy 80% or more of an overall length of the flow channel.

The through channels may be evenly arranged in the width direction of the electrode hole, and the value (W/n) obtained by dividing the width W of the electrode hole by the number (n) of the through channels may range from 200 to 400 mm.

The ratio of the width of the electrode hole to a sum (n×w) of the widths (w) of the through channels may be in the range of 5 to 8.

The height of the flow channel may increase along a flow direction.

The flow frame may include a protruding dam surrounding an outer periphery of the flow channel at the front of the frame body.

According to an exemplary embodiment of the present disclosure, shunt current loss occurring between unit stacks of a redox flow battery can be reduced without any additional complicated controlling apparatus, by way of providing a flow frame structure capable of reducing the shunt current loss.

According to an exemplary embodiment of the present disclosure, channels inside a cell frame of a redox flow battery can be designed effectively by way of proposing the number of through channels appropriately for the width of the electrode hole.

Accordingly, channels can be disposed more effectively by using a cell frame having a given size, and as a result, electrolyte can be distributed more efficiently and the shunt current loss can be reduced.

DETAILED DESCRIPTION

Terms and words used in the present specification and claims are not to be construed as a general or dictionary meaning but are to be construed meaning and concepts meeting the technical ideas of the present invention based on a principle that the inventors can appropriately define the concepts of terms in order to describe their own inventions in best mode. Therefore, while the present invention are description with reference to the certain particular embodiments and the accompanying drawings, it is to be understood that the embodiments are merely illustrative and various equivalents and modifications are possible without departing from the spirit and scope of the present disclosure as defined in the following claims.

Hereinafter, a redox flow battery with reduced shunt current loss according to an exemplary embodiment of the present disclosure will be described in detail with reference to the accompanying drawings.

Figure 1:
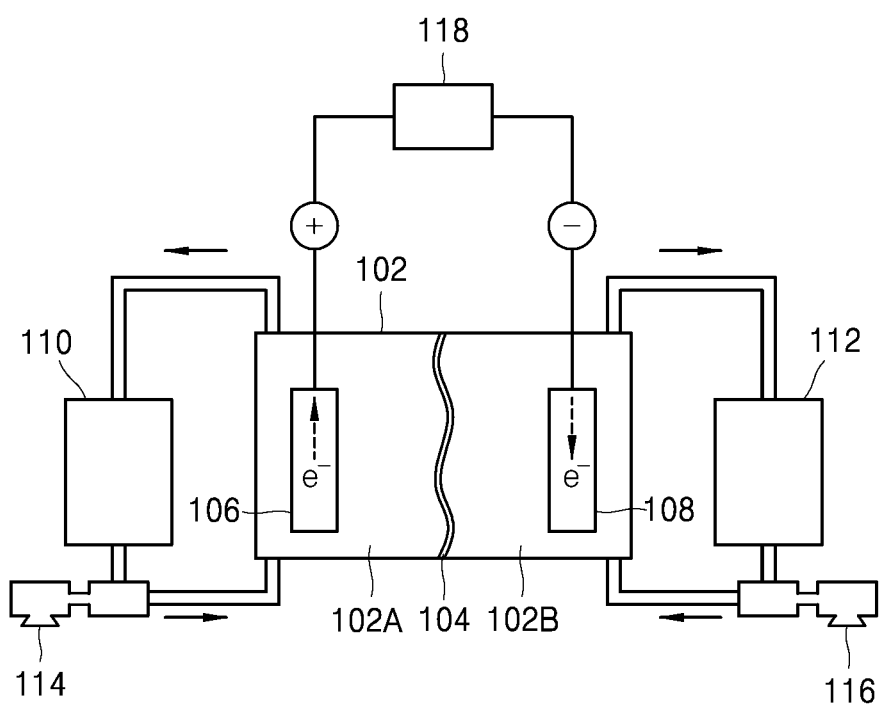
FIG. 1 is a schematic view showing a configuration of a redox flow battery.
Figure 2:
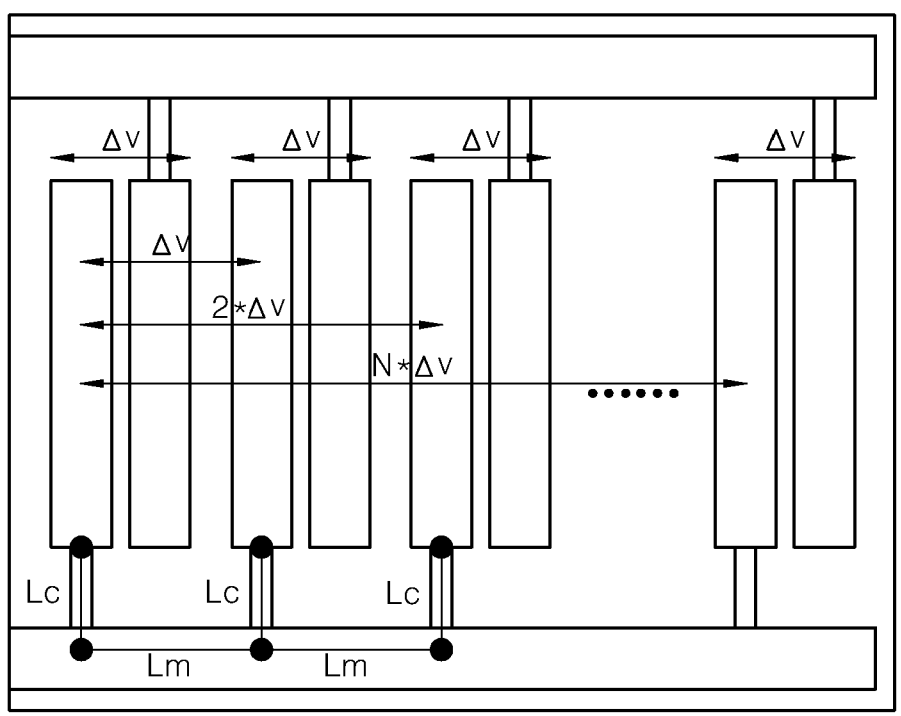
FIG. 2 is a view for illustrating shunt current loss occurring in a redox flow battery.

FIG. 2 is a view for illustrating shunt current loss occurring in a redox flow battery.

The redox flow battery generates electric energy by using reduction/oxidation reaction between anolyte and catholyte with an ion exchange membrane therebetween. Because the voltage generated in one unit cell is low, it is typical to employ a stack of a number of unit cells.

The stack is formed by stacking a plurality of unit cells. The electrolyte is supplied to each unit cell through a common inlet channel as shown in FIG. 2. The electrolyte output from each unit is retrieved through an outlet channel (not shown) similar to the inlet channel.

The shunt current is generated when the electrode of a unit cell of a stack is connected to the electrode of an adjacent cell with the electrolyte. The voltage difference equal to the cell voltage is generated between the electrode of a unit cell and the electrode of the next unit cell. This occurs because the unit cells of the stack are connected in series with each other.

Therefore, the voltage difference gradually increases with the number of stacked unit cells. If one cell voltage is 1.2V and a total of 10 cells are connected in series, the voltage difference between the first and last electrodes becomes 10.8 V (1.2 V×9).

The shunt current varies with the voltage difference between the cells and the electrolyte resistance.

The shunt current generated in or between stacks occurs in several cells based on different factors and thus is represented as a complicated electric circuit model. However, it can be simply represented as follows:

Shunt Current: $I = \Delta V / R_s$

Shunt Resistance: $R_s = R \times L / A$

Rs: Shunt Resistance
R: Electrolyte Specific Resistance
L: Length of Electrolyte Path between Cell Electrodes
A: Cross Sectional Area of Electrolyte Path between Cell Electrodes For a given electrolyte, in order to reduce the shunt current, it is necessary to reduce the voltage difference or increase the shunt resistance.

The shunt resistance can be increased by decreasing cross sectional area of the channel through which the electrolyte flows, or by increasing the length of the channel.

Figure 3:
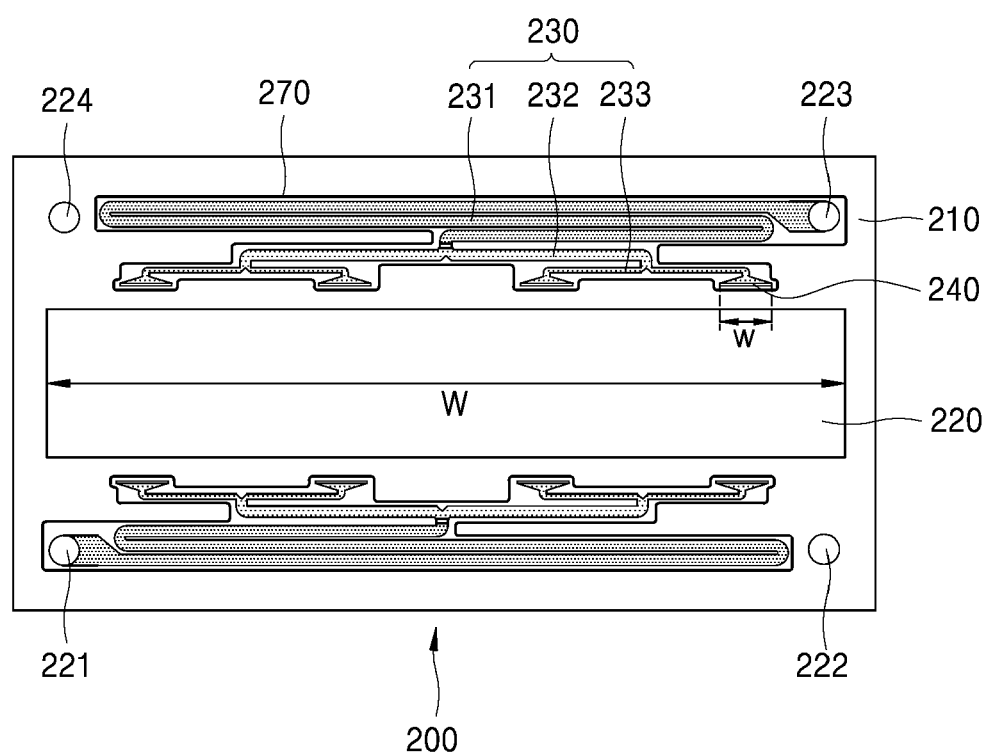
FIG. 3 is a front view showing a flow frame for a redox flow battery according to an exemplary embodiment of the present disclosure.
Figure 4:
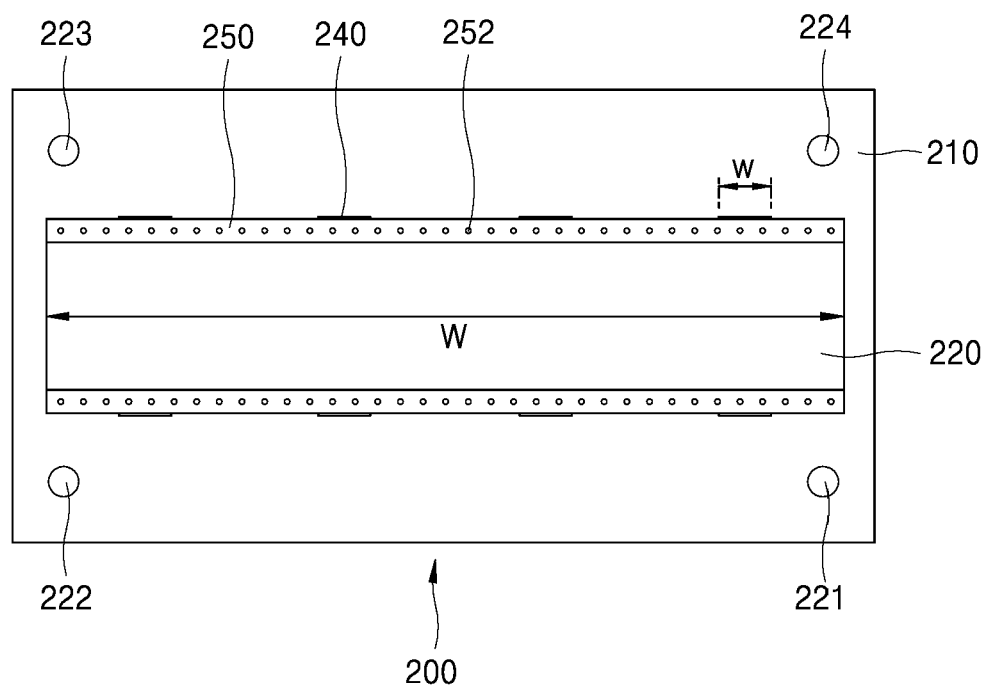
FIG. 4 is a rear view showing the flow frame for the redox flow battery according to the exemplary embodiment of the present disclosure.

FIG. 3 is a front view showing a flow frame for a redox flow battery according to an exemplary embodiment of the present disclosure. FIG. 4 is a rear view showing the flow frame for the redox flow battery according to the exemplary embodiment of the present disclosure.

As shown in the drawings, the flow frame 200 of the redox flow battery according to the exemplary embodiment of the present disclosure includes a plate-like frame body 210, an electrode hole 220, four through holes 221, 222, 223 and 224, a flow channel 230, through channels 240, and distribution channels 250.

The four through holes 221, 222, 223 and 224 are disposed at the corners of the frame body 210, respectively. The four through-holes 221, 222, 223 and 224 includes two pairs, which of each includes two through holes diagonal to each other. The anolyte flows through the pair of through holes 221 and 223, while the catholyte flows through the other pair of through holes 222 and 224.

The flow channel 230 is disposed above and below the electrode hole 220 so that the through holes diagonal to each other in each pair are connected to each other via the electrode hole 220.

The electrolytes are input through the lower through holes 221 or 222 and are output through the upper through holes 223 or 224, respectively.

As shown in the drawings, when there are four through channels 240, the flow channel 230 has four branches which are connected to the respective through channels 240.

Preferably, the change in cross-sectional area of the flow channel 230 before and after the branch points is 10% or less.

In the illustrated embodiment, the flow channel 230 is branched off twice.

If the cross sectional area of the flow channel changes more than 10% before and after the branch points, the fluid resistance greatly changes before and after the branch points such that the electrolytes are not evenly distributed or the pump loss increases.

The flow channel may be divided into first to third flow channels based on the branch points. A first flow channel 231 is connected to the through hole 223, and a second flow channels 232 and a third flow channels 233 are connected to the through channels 240 after the branch points. Preferably, the length of the first flow channel 231 occupies more than 80% of the overall channel length.

If the lengths of the second flow channels 232 and the third flow channels 233 after the branch points increase, the second flow channels 232 and the third flow channels 233 occupy larger area of the frame body 210. The first flow channel 231 branches off into two the second flow channels 232, and then the second flow channels 233 branch off into the four third flow channels 233, such that they are connected to the four through channels 240, respectively.

If the lengths of the second flow channels 232 and the third flow channels 233 increase, more space between the channels are required, and thus a larger area is required compared with increasing the length of the first flow channel 231.

Therefore, if the first flow channel 231 occupies 80% or more of the overall channel length, a longer channel can be made for a given area.

In addition, as shown in FIG. 3, it is preferable that a protruding dam 270 is provided on the front of the frame body 210 to surround the flow channel 230. The protruding dam 270 is disposed to surround the flow channel 230 in the form of a closed curve to prevent the electrolytes flowing through the flow channel 230 from leaking.

Referring to FIG. 4, the electrolytes flowing out of the through channels 240 are evenly dispersed into the electrode hole through the distribution channel 250. The distribution channel 250 is formed to have the same width as the electrode hole 220, and the through channels 240 are evenly distributed across the distribution channel 250.

In addition, a plurality of distribution projections 252 is disposed along the distribution channel 250. The distribution projections 252 serve to disperse the electrolytes flowing through the through channels 240.

As the through channels 240 are evenly disposed along the distribution channel 250 and the distribution channel 250 has the same width as the electrode hole 220, the number of the through channels, and the relationship between the width of the through channel and the width of the electrode hole has to be determined appropriately to evenly distribute the electrolytes.

The more the through channels 240 are, more evenly the electrolytes are distributed. However, more through channels 240 require more branches of the channel, and if the number of branches of the channel increases, the surface area occupied by the channels after the branches in the frame body 210 becomes large. As a result, the length of the first flow channel 231 becomes relatively short. As the length of the first flow path 231 becomes shorter, the shunt resistance is reduced, thereby increasing the shunt loss.

As shown in FIG. 4, it is desired that the through channels are evenly arranged in the width direction of the electrode hole, and the value (W/n) obtained by dividing the width W of the electrode hole by the number (n) of the through channels ranges from 200 to 400 mm.

In other words, each of the through channels is expanded with the width of the electrode hole of 200 to 400 mm. If the width of the electrode hole each of the through channels is responsible for is less than 200 mm, the number of branches of the flow channel increases, such that the shunt loss increases.

On the contrary, if the width of the electrode hole each of the through channels is responsible for is greater than 400 mm, the electrolytes may not be evenly supplied to the electrode hole.

Incidentally, the ratio of the width of the electrode hole to the sum (n×w) of the widths w of the through channels is preferably in the range of 5 to 8. This means that the width of expansion from the through channels to the electrode hole is in the range of 5 to 8 times.

Figure 5:
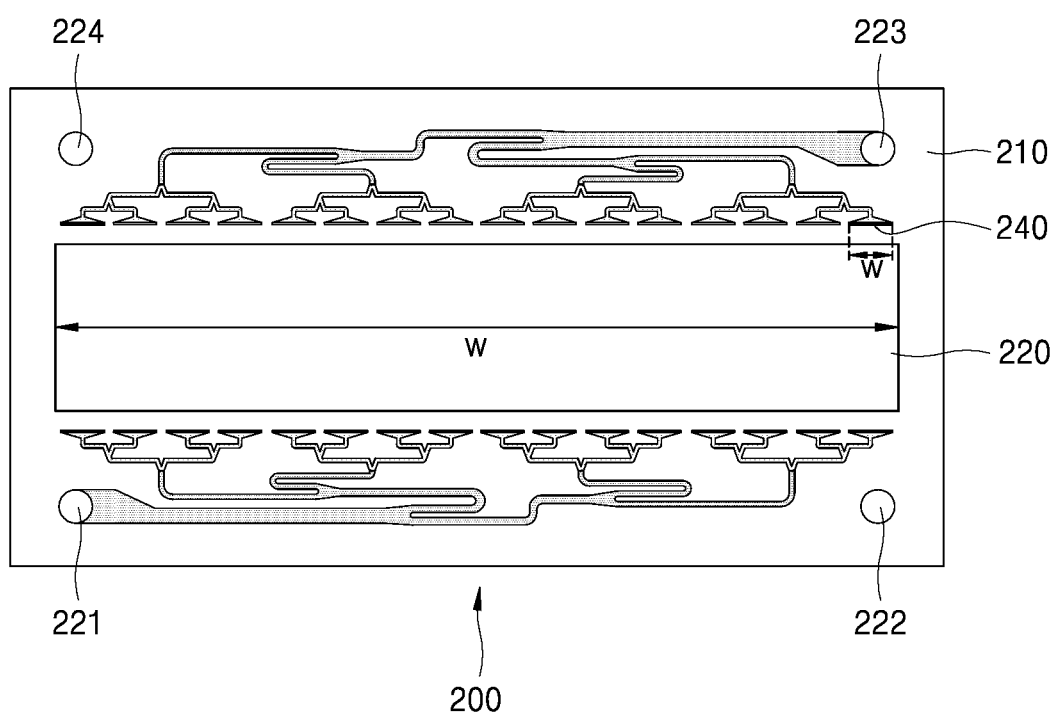
FIG. 5 is a front view showing a flow frame for an existing redox flow battery.

FIG. 5 is a front view showing a flow frame of a conventional redox flow battery.

Previously, there were a large number of through channels, taking into account distribution of electrolytes only.

The conventional flow frame shown in FIG. 5 has a total of 16 through channels.

In order to divide the electrolyte flowing through an electrode inlet hole into 16 through channels, it is required to design such that the flow channel has to be branched off three times, and each branch of the flow channel has the same pressure drop. Therefore, there were many limitations in the design of the flow channel, and the shunt resistance was low due to the long flow channel after the branching. As a result, the shunt loss increases.

TABLE 1

|   | Comparative Example 1 | Example 1 | Example 2 |
|---|---|---|---|
| W | 640.0 mm | 640.0 mm | 1010.0 mm |
| w | 31.0 mm | 43.0 mm | 43.0 mm |
| n | 16 | 2 | 4 |

TABLE 2

|   | Comparative Example 1 | Example 1 | Example 2 |
|---|---|---|---|
| W/n | 40.0 mm | 320.0 mm | 252.5 mm |
| W/(w × n) | 1.290 | 7.442 | 5.872 |

Tables 1 and 2 show the relationship between the width of the electrode hole, the number of through channels and the width of the through channels of the conventional flow frame and those of the flow frame according to the embodiments of the present disclosure.

The conventional flow frame as shown in FIG. 5 had the electrode hole having the width of 640 mm and 16 through channels, such that each of the through channels was responsible for the width of the electrode hole of 40 mm, and accordingly the ratio of the width of the electrode hole to the width of all of the through channels (w×n) was approximately 1.3.

The flow frame according to Example 1 had the electrode hole having the same width of 640 mm and 2 through channels, such that the width of each of the through channels (w) was set to be 43.0 mm, and accordingly the width of the electrode hole each of the through channels is responsible for was 320 mm. The ratio of the width of the electrode hole to the width of all of the through channels (w×n) was approximately 7.4.

The flow frame as shown in FIGS. 3 and 4, i.e., according to Example 2 had the electrode hole having the width of 1,010 mm and 4 through channels, such that each of the through channels was responsible for the width of the electrode hole of 252.5 mm, and accordingly the ratio of the width of the electrode hole to the width of all of the through channels (w×n) was approximately 5.9.

From the above, it can be seen that the electrolytes were distributed as evenly in Examples 1 and 2 as in Comparative Example 1.

It should be appreciated that the above-described embodiments are illustrative in all aspects but are not limiting. The scope of the present disclosure is defined only by the appended claims rather than the above-mentioned detailed descriptions. In addition, all modifications or alterations deduced from the spirit and the scope of the claims and equivalents thereof are to be construed as falling within the scope of the present disclosure.

What is claimed is:

1. A flow frame for a redox flow battery, the frame comprising:
    a frame body having a plate-like shape and an electrode hole in its center where an electrode is to be disposed;
    four through holes disposed at corners of the frame body, respectively;
    a flow channel disposed at a front of the frame body above and below the electrode hole so that two of the through holes diagonal to each other as a pair are connected to each other via the electrode hole;
    through channels disposed at distal ends of the flow channel to cause electrolyte flows toward a rear of the frame body; and a distribution channel connecting the through channels with the electrode hole at the rear of the frame body, wherein the flow channel has at least one branch point, and a change in cross sectional area of the flow channel before and after the branch point is 10% or less, wherein the flow channel comprises a first flow channel connected to the through hole and second flow channels connected to the through channels after the branch points, and the second flow channels branch off from the first flow channel, and wherein a length of the first flow channel is 80% or more of an overall length of the flow channel.

2. The flow frame of claim 1, wherein the through channels are evenly arranged in a width direction of the electrode hole, and wherein a value (W/n) obtained by dividing the width (W) of the electrode hole by the number (n) of the through channels ranges from 200 to 400 mm.

3. The flow frame of claim 2, wherein a ratio of the width of the electrode hole to a sum (n×w) of the widths (w) of the through channels ranges from 5 to 8.

4. The flow frame of claim 1, wherein a height of the flow channel increases along a flow direction.

5. The flow frame of claim 1, comprising: a protruding dam surrounding an outer periphery of the flow channel at the front of the frame body.

* * * * *